Fig. 1

INVENTORS
PAUL R. LOZEAU
EUGENE G. RICHTER
FRANK H. SCHALLER

BY

John J. McCormack
ATTORNEY

INVENTORS
PAUL R. LOZEAU
EUGENE G. RICHTER
FRANK H. SCHALLER

INVENTOR
PAUL R. LOZEAU
EUGENE G. RICHTER
FRANK H. SCHALLER
BY
ATTORNEY

United States Patent Office 3,421,754
Patented Jan. 14, 1969

3,421,754
SELECTION APPARATUS
Frank H. Schaller, Needham Heights, Eugene G. Richter, Lexington, and Paul R. Lozeau, Southville, Mass., assignors to Honeywell Inc., Minneapolis, Minn., a corporation of Delaware
Filed July 5, 1966, Ser. No. 562,692
U.S. Cl. 271—61      13 Claims
Int. Cl. B65h 1/02

ABSTRACT OF THE DISCLOSURE

For the "in-feed" section of a document handling apparatus, an improved throating arrangement for separating documents injected from a stack and comprising a throat knife and an opposed throat block, the knife edge being notched in a prescribed "crenelated" fashion and the opposing, gap-defining, block edge being complementarily notched so that, in certain embodiments, documents which have overly-thick portions may be passed and "under-thickness" documents passed by injecting them through such a "crenelated" throat which ripples or corrugates the concerned document portion.

---

A general object of the present invention is to provide a new and improved apparatus for the feeding of documents from a stack into a utilization machine, e.g. of the type adapted to manipulate documents for data processing purposes. More specifically, this invention relates to such apparatus including a novel crenelated throating arrangement characterized by its ability to control the selection of documents singly and yet accommodate wide variations from the norm in document thickness, for instance, such as caused by warping, swelling, bending, spindling, stapling or tearing of the document, by overthick documents and the like.

Document-feeding devices, such as card pickers and the like, are widely used in business machines or data processing equipment for purposes of selecting documents singly from a stack to be translated through a utilization machine wherein information may be impressed thereon and/or sensed therefrom for data processing purposes. With the advent of very high speed electronic data processing, it is found that a severely limiting factor on processing speed as well as reliability, is selecting speed, i.e. the rate of document selection (e.g. card picking speed). It may be appreciated that when documents are selected at ever-increasing speeds, the incidence of jamming and other feeding anomalies increases markedly and reliability usually suffers. This is especially so with documents that have thickness anomalies or protuberances, such as tears, swellings, staple hole protrusions, folds, spindle protuberances, etc. It is not uncommon, for instance, for check-type documents which are processed through several clearing houses, banks and the like at high speeds and often automatically to suffer physical damage therewhile, often leading to thickness anomalies, especially from folding, bending and swelling (moisture absorption). In some cases, a document may simply have been stored (on edge) for a period of time under "non-standard" temperature/humidity conditions resulting in a warp or bow therein. Such thickness anomalies tend to limit maximum selection speeds and more importantly any one of them (or combination thereof) can lead to machine failures, such as a picking jam, requiring the intrusion of an operator, costing machine "downtime," often injuring other parts, etc. The invention provides an improved selection arrangement directed toward solving these problems.

The point in the selection mechanism where such thickness anomalies give the most trouble is at the throat where there is characteristically provided a throating assembly comprising a throat knife providing a sharp reference knife edge terminating the bed of the document hopper disposed to cooperate with a confronting block edge in a throat block. The throat block stops the advance of a card at the selection station in proper alignment with the selection (picking) plane defined by the aforesaid edges, spaced about one card-thickness apart. This throating assembly is intended to perform, among other things, the function of aligning the cards for translation thereafter through the utilization machine and assuring that one card, and only one, will be picked at a time.

The aforementioned document thickness anomalies have for a long time presented a practically insoluble dilema to workers in the art. That is, when the throat gap, i.e. the space between knife edge and the block edge, is closed down to pass only one "normal-card" thickness and thus prevent the picking of two cards (double pick error), there is the high likelihood that any minor thickness anomaly (e.g. a fold) in a document will not pass, but will cause a picker jam. On the other hand, opening the gap to pass such protuberances will likely allow a double pick. Thus, workers in the art have long yearned for a card picking device and separating (throating) mechanism therefor which would reliably select only one card and yet accommodate the characteristic thickness anomalies often found. This the invention provides.

Such picker jams very commonly occur in conventional document selection arrangements when "overly-thick" documents are attempted to be fed without adjusting the throat gap accordingly. This becomes a very serious problem when selection devices are required to handle documents of varying thickness (e.g. from different sources). For example, in the feeding of documents into character-recognition equipment, it is often desirable to process light, flimsy checks interspersed with heavier, stiffer punched card stock—of course without adjusting the throat gap each time a "different" document is fed. The thickness of such documents may vary due to manufacture, handling or other causes. For example, returnable media often suffer an increase in "effective thickness" due to exposure to moisture, folding or related distortion, etc. Such thickness variations greatly complicate the dilema of gap adjustment, since the gap must be set very carefully to "just-clear" the thicker stock and yet not permit a double pick of the thinner stock. As is evident, very slight protrusions in the thickness of the thicker documents, such as "fold-bulge" would likely not pass such a "compromise" gap-dimension. This problem is so serious in some prior art devices that the throat gap thereof is set at a number of manually selected dimensions—something very undesirable in "automatic" data processing.

This problem may be more graphically demonstrated by consideration of the actual dimensions involved. The thickness of stock may be prescribed as thin as 6 mils though punched cards are typically about 7 mils, i.e. (.0066"–.0074" thick), while the thickness of heavily-handled "Savings Bond" stock, although set to a standard "8 mils," may at times assume about 10 mils. Workers in the art will also recognize that the "card-bow" that is typically induced in a card in the throat gap might typically require a throat gap of about 10.5 mils to clear such "10 mil" bond stock, apart from any thickness anomalies therein. Thickness anomalies, such as those aforementioned, will not uncommonly add as much as about 15–20 mils to a card thickness (e.g. from stapling bulges). Thus, for the case given, the throat gap to pass "War" or "Savings" Bond documents with large (15 mil max.) anomalies must be set as high as 25–26 mils to clear such "thickened" cards. Now, it will be readily appreciated that such a clearance can easily pass two thin normal "6 mil" cards (a double pick error). Using the crenelated throat of the invention, however, a nominal throat gap set to about 9 mils can pass such "over-thick" documents without permitting such a double pick.

Another, and related, problem with such selection devices is that of card-slip whereby the foremost card in a stack may accidentally slip down into the throat gap without being driven therethrough at "picking time" (a "sneak or free pick"). Such a "sneak pick" is more often found in an environment where the card hopper is vibrated somewhat inducing the slippage of such a card through the throat especially where little normal force is thrusting the card against the picker. The invention helps to prevent such an accidental card picking and problems attendant thereto.

The present invention has been designed to overcome these major weaknesses in prior art, document-selection mechanisms by incorporation of separating means adapted to enlarge the "effective width" of the throat gap while at the same time assuring the selection of a single document (no double pick). This separating means comprises a novel crenelated throating arrangement whereby the reference edges comprising the throat gap are crenelated or formed with opposed projections and slots, in mutual registry, to allow a "thicker document" to be "rippled" as it passes through the throat gap. That is, these projections and slots can function together to cause a slightly "overthick" thrust document to "furrow" so as to pass therebetween.

According to an improved version, such a crenelated throating device is nonetheless provided with sufficient (supporting) surface area and with such a picker knife configuration for engaging "waiting documents" (those adjacent the document being fed) so that they will not be damaged (harmed) by the picking device.

It is accordingly an object of the present invention to provide a new and improved document selection apparatus. A related object is to provide such an apparatus having an improved crenelated throating arrangement. Another object is to provide such a device adapted for use in a card-feeding apparatus where the throat edges are crenelated to distort the document passing therethrough in a prescribed manner for accommodating thickness enlargements therein.

It is a more specific object to provide a throating assembly wherein the reference, gap-defining, edges thereof comprise a number of slots spaced along the length thereof in opposed, alternating, relation, so as to "furrow" enlarged documents passing therethrough. A still further object is to provide a prescribed number of such slots in conjunction with cooperating respective crenels disposed opposite thereto for defining a throat gap.

Still a further object is to provide such throating arrangement wherein the effective total surface area supporting a waiting card, adjacent that being picked, and the shape of the picker knife are both so arranged as to prevent damage thereto from the picker knives.

The foregoing objects of the invention are achieved by provision of a crenelated throating assembly embodiment in the picking portion of a data processing machine for handling punched cards, this throating assembly comprising a throat block having about five like crenels, or teeth, of prescribed configuration arranged relatively uniformly therealong and a mating throat knife having a complementary set of five slots aranged in opposed registry with the said block crenels, lands between said slots and the crenels each defining opposed reference edges to constitute a uniform throat gap of approximately a card thickness or even less, if desired.

Various features of novelty which characterize the invention are pointed out with particularity in the claims annexed to and forming a part of the present specification.

For a better understanding of the invention, its advantages and specific objects obtained with its use, reference should be had to the accompanying drawings and descriptive matter in which are illustrated and described the preferred embodiments of the invention.

In the drawings, wherein like reference numerals denote like parts.

In general

Figure 1:
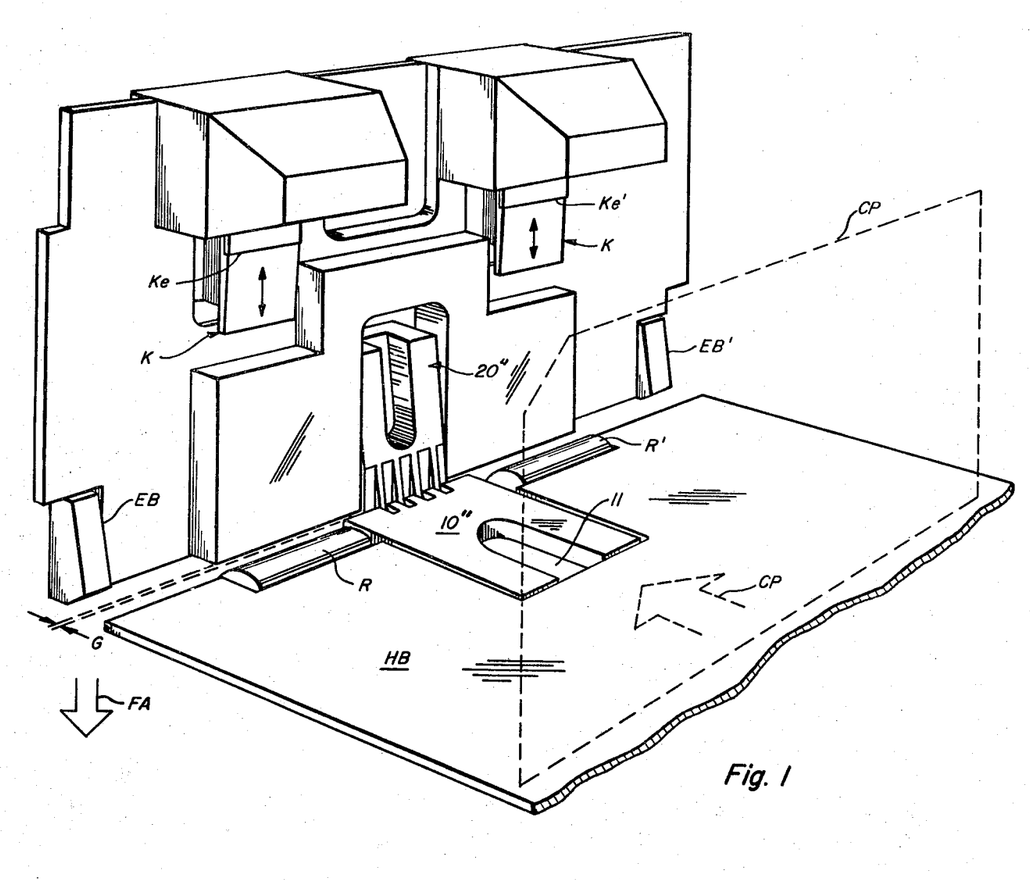
FIGURE 1 is a perspective view of a punched card selection assembly incorporating one embodiment of the invention, some elements thereof being omitted and some simplified for clarity of explanation.

Referring first to FIGURE 1, there is here illustrated a representative form of document-selection/feeding apparatus, or picker, associated with a data processing utilization machine, the feeding apparatus being essentially conventional and comprising a pair of reciprocable picker knife blocks K, K', a throating assembly 10"–20" and a pair of alignment pads EB, EB' disposed at the end of a feed hopper (only base HB of the hopper being shown). It will be understood by those skilled in the art that this feeding apparatus is adapted to be confronted by a stack of cards as illustrated in phantom at CP to be thrust thereaganist, as indicated by phantomed arrow CP, for instance, denoting the thrust from a card weight, card pusher device, the hopper inclination, or the like. This engagement will position the foremost card in the stack against throating assembly 10"–20" and pads EB, EB', bowingly, so as to be thereafter thrust through a prescribed throat gap G by knife edge portions KE, KE' of knife blocks KB, KB', respectively. Cards will thus be thrust in prescribed alignment along a picking direction FA to be translated and manipulated through the utilization machine thereafter, for instance, being advanced by feed rolls R, R' in concert with mating rolls PR (FIGURE 4), as understood in the art. Knife blocks KB, KB' are selectively actuable (arrows) to reciprocate in unison by picker motor means (not shown); while feed rolls R, R' and PR are continually rotated (by means not shown).

Throating assembly 10"–20" comprises a throat knife 10" and a cooperating throat block 20". It will be understood that throat knife 10″ is intended to provide a reference knife edge (along axis K—K, FIGURE 3) which in cooperation with an opposing reference block edge (axis B—B, FIGURE 3) defines a throat gap G of prescribed uniform width through which prescribed dimensioned cards may singly be thrust without jamming. It will also be understood, for instance, with reference to FIGURE 2, that the lateral position of gap G, that is the location of gap-defining elements 10–20 (equivalent with elements 10″–20″, except where otherwise noted) along direction CP (this may be made adjustable where desired) is arranged to cooperate with the lateral position of pads EB, EB′ so as to accommodate a prescribed bow (concave in direction CP) in a card to be fed, such as is indicated for card C–1 in FIGURE 2. This weights cards firmly against throat 10″–20″ as known in the art. Card C–1 will be understood as representing a "standard thickness' card being thrust feedingly through gap G by cooperating knife edges KE, KE′. This bow, of course, will induce a certain amount of curvature along gap G between elements 10″–20″ defining it. As detailed below throat block 20″ presents a number of projections, or crenels, $c$, separated by merlons (slots) $m$ to define a block edge (B—B, FIG. 3). Knife edge K—K or knife 10″ is interrupted with slots $s$ arranged to register with crenels $c$. Though this embodiment shows four such crenels and registering slots, the preferred throating embodiment 10–20 (FIGURES 2–7) employs five such.

Figure 2:
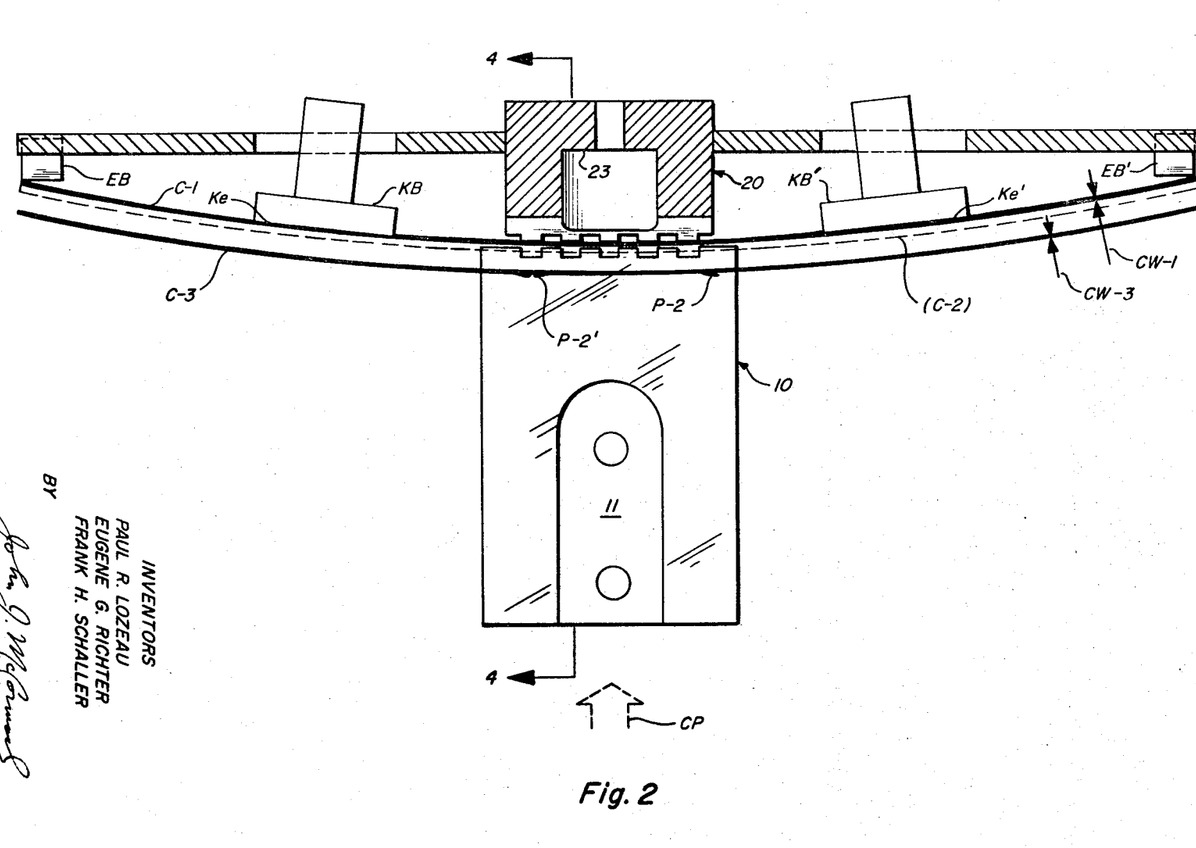
FIGURE 2 is a plan view of the improved preferred throating arrangement and related elements of the picking assembly like those of FIGURE 1; the throating embodiment being slightly modified therefrom and a number of punched card documents being shown in relation therewith.

FIGURE 2 is intended to capsulize salient elements of the invention, as well as the general operation thereof with typical card documents. More particularly, it will here be presumed that card C–1 as thrust by knives KE, KE′ is engaged between the elements of preferred throating assembly 10–20 modified from assembly 10″–20″ as above. Cards are thrust through assembly 10–20 as guided by cam surface 21 of block 20 (i.e. by the top surfaces 25 of crenels C–CF, FIG. 5), on one side and by the lower portion of card C–2, on the other. Oversized (overthick) cards C–4, C–3 are indicated in a somewhat exaggerated manner in FIGURES 2 and 10. This is for illustration purposes only, and is not intended to necessarily reflect what actually happens to a card since this is not definitely known. It will be seen in FIGURE 10 that over-thick card C–4 is being "furrowed," or sinuously wrinkled, between the alternating opposed crenels $c$ and slots $s$. Such furrowing also imparts a "thrusting-stiffness" (along thrust direction FA) to the fed document, helping to resist buckling, at least momentarily. It will also become apparent that various anomalies in card thickness, such as protruding tears PP–2, P–2 or bumps PP–1, P–1 (cards C–4, C–3, FIGURES 10 and 2 respectively) will be accommodated despite the fact that the "straight-through" or nominal gap G could not pass them. Gap G may be set at, or even slightly less than, a "standard" card thickness, i.e. thickness CW–1 of C–1 (CW–2 for C–2 is same, etc.). "Waiting" card C–2 will be understood to be the "next-in-line" of the stacked cards after "fed-card" C–1, being indicated also in FIGURE 4 (side view). Tear P–2 and annular, "staple-type" ridge P–2′ are representative of typical "thickness anomalies" in selected documents, as in enlarged thickness CW–4 of card C–4, resulting from moisture absorption or the like.

*Crenelation construction*

Figure 3:
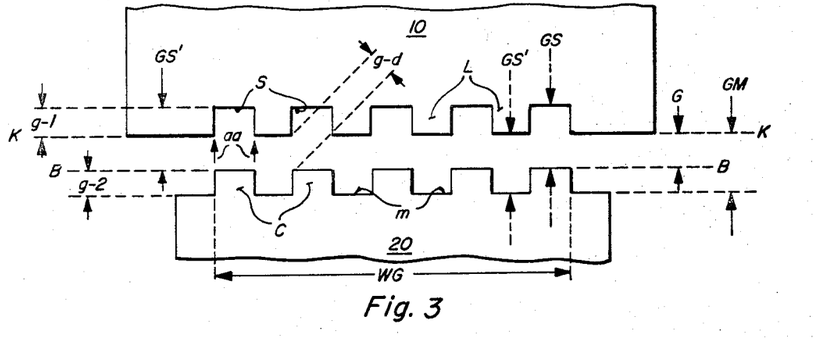
FIGURE 3 is a plan view, somewhat enlarged, through the opposed throat block, throat knife elements in FIGURE 2.
Figure 10:
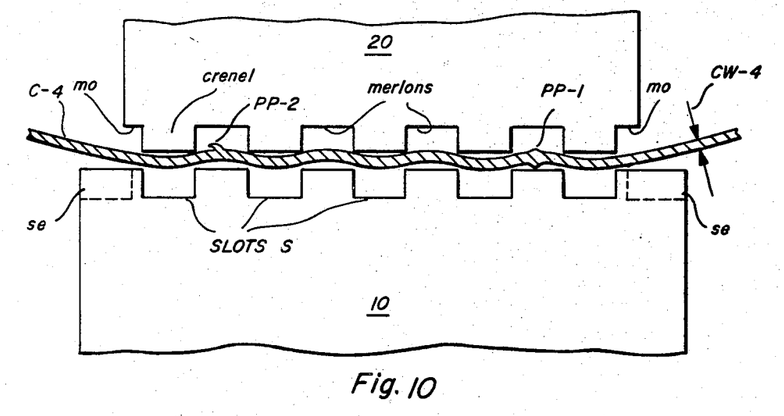
FIGURE 10 is an enlarged, somewhat idealized sectional view after FIGURE 3, with an over-thick card document in illustrative problematical relation therewith.

The novel crenelated throating construction of the embodiment mentioned generally and functionally above will now be more particularly described. FIGURE 3 is a plan view of the throat gap defining elements in FIGURE 2, namely throat knife 10 and throat block 20, throat gap G being defined between the reference-edge planes K—K and B—B of knife 10 and block 20, respectively, as aforesaid. Assembly 10–20 may be considered as a card-aligning arrangement, knife 10 being the edge-aligning portion and block 20 being the surface (leading) aligning portion. Gap G is preferably set to the dimensions of a standard, "nominal," card thickness, or slightly more. However, according to a surprising feature of the invention (as seen in FIGURE 10) dimension G may be less than card thickness (e.g. 6 mils) without preventing "standard" cards (e.g. 7 mils thick) from successfully passing through the throat defined thereby. The furrowing action whereby such "oversized" cards are passed is illustrated for card C–4 in FIGURE 10. Such a narrow nominal throat gap can prevent the "sneak pick" problem aforementioned. It will be apparent that a plurality of sloped, projecting ridges, or crenels $c$ are provided on the face of block 20 somewhat equidistant along gap G to present coplanar card-guiding surfaces 25 so that the apices, or knees, $kn$ thereof define reference gay edge B—B. The number of these crenels may be varied somewhat according to need. However, it is preferred that for an embodiment like that shown, they comprise about 5, or slightly more. Much fewer, for instance, about 2, will be undesirable as leading to excessive card bow, resulting card scraping, etc. However, enough such crenels should be provided over a sufficient effective throat length WG to reduce bow there (e.g. semi-straighten, or collimate, the card). Length WG will not be so large as to excessively bend cards away from pads EB. The spacing of crenels $c$ may vary; however, knife slots $s$ should be maintained in registry opposite thereto. Slotted merlons $m$ between crenels $c$ must be cut sufficiently deep ($g$–2) to accommodate maximum card thickness anomalies, preferably considerably more, e.g. to allow for some bow there. Slots $s$ should be cut to a like depth (e.g. somewhat more than one length of the largest protuberance), but not much more to keep as much card-supporting surface area on knife 10 as possible.

Thus, knife 10 is slotted along reference edge K—K thereof to include slots $s$ (cf. FIGURE 10 also) of prescribed depth $g$–1 (similar to $g$–2) and disposed opposite respective ones of crenels $c$ in registry therewith, being somewhat the same, or nearly the same width as the widest dimension of crenels $c$. Thus, there will be the same number of slots $s$ along knife edge K—K as there are crenels $c$ along block B—B, slots $s$ being arranged in opposed registration with crenels $c$. Slots $s$ will be spaced by lands L, adapted to support "waiting" cards as aforesaid. Where not needed for such support, the outer areas may also be cut-out as indicated at outboard slots $se$ in FIGURE 10. Slots $s$ need not exactly conform to the shape of the opposed crenels and both the crenels and the slots may be arranged to have various smooth or rectangular conformations, such as that indicated below relative to FIGURES 9 and 11. Thus, although the crenels and opposed slots in FIGURE 3 are illustrated as being of relatively orthogonal shape, this need not be exactly followed. In many cases, the sides thereof will be somewhat chamfered to accommodate fabrication (machining) convenience, to eliminate burrs, and the like. It will be adequate for some embodiments to merely form slots in knife 10 by making rounded semi-circular (or elliptical) grooves therein positioned opposite the crenels of blocks 20 and roughly the same diameter. Such a cut-out is indicated at slots $s'$ in FIGURE 11.

In any event, an important consideration will be the diagonal gap distance $g$–$d$ which will be the distance between any crenels $c$ and the closest portion of the land L opposite thereto. These diagonal gap dimensions are exemplarily traced by arrows $aa$. However, FIGURE 3 should be understood as merely showing the special case where gaps G and G–D are of relatively equal length; that is, in this case, there is really no true "diagonal," since lands L are of equal width with slots $m$. Thus G–D can exceed G where lands L are narrower than slots $m$ or, in a case like the embodiment of FIGURE 9, where the more representative "diagonals TD" are larger than the orthogonal gap T there. It will become evident (see below) that gap $g$–$d$ should be about as large as the thickest document to be handled. (Of course, this may be adjusted by sliding knife 10 along base HB—mentioned above.) In certain cases a chamfer along both sides of crenels c will lengthen diagonal gap aa relative nominal gap G. For instance, with about 20 mils chamfered away from each side of crenels c, leaving a 30 mil width thereof, it was found that setting G at: 7–9 and 11 mils gave $g-d$ gaps of: 21.2–22.0 and 22.5 mils, respectively (not reflected by the proportions in FIG. 3, however).

Another gap dimension defined by the crenelated structure are those opposite the cut-outs, that is, the "slot gap GS," defined by slot $s$ ($g$–1) plus gap G and the "merlon-gap GM" defined by the depth of merlon $m$ ($g$–2) plus nominal gap G. Exemplary dimensions for the preferred embodiment will be indicated relative to the above-described figures, but for purposes of illustration, here, it may be mentioned that for a standard card thickness of about 7–8 mils, nominal gap G may be set at about 9 mils (down to 6 mils if required); while diagonal gap $g-d$ is set to about 22 mils and cut-outs $g$–1, $g$–2 (for slot, merlon) both about 13–15 mils making the slot gap GS and the merlon-gap GM both about 24–26 mils. Such punched-card stock has been handled with essentially one hundred percent reliability despite the presence of a wide variety of document anomalies and mutilations that would readily jam a conventional throat; like success has been enjoyed with other documents, such as "post card" stock of about 9 mils (nominal) thickness.

Figure 4:
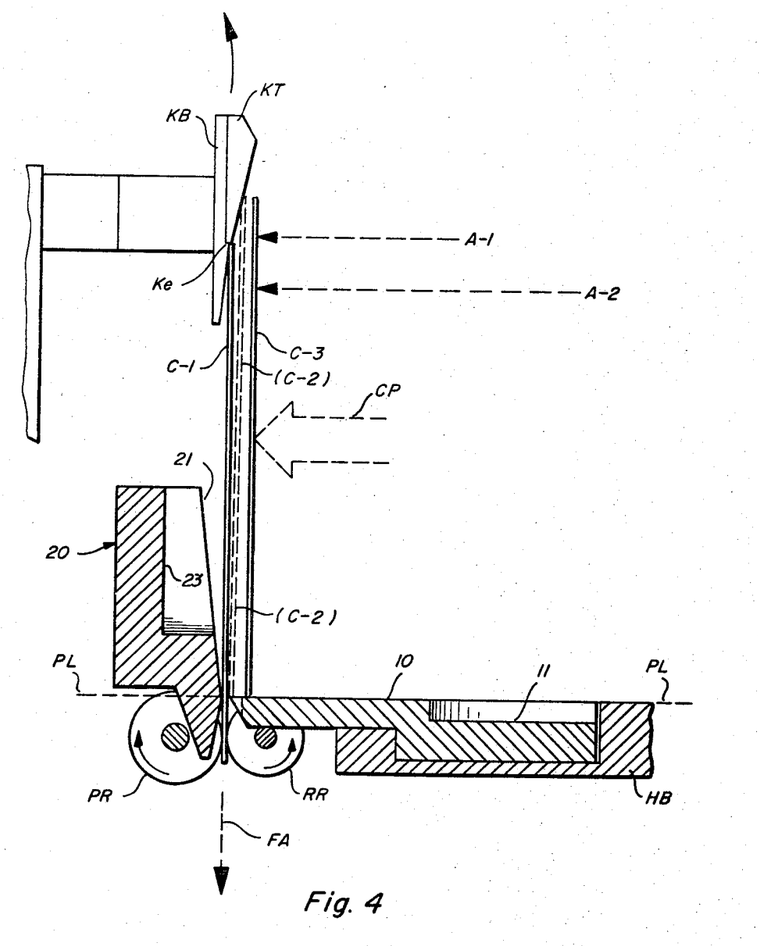
FIGURE 4 is a simplified side elevation of picking elements in the arangement in FIGURES 1 and 2 at a particular phase in the card picking cycle, with a number of card documents in various illustrative relations therewith.

FIGURE 4 illustrates, in side sectional view along lines 4—4 (in FIGURE 2) the aforementioned throating block 20 and throating knife 10. FIGURE 4 also shows the cooperation therewith of a few exemplarily indicated cards C–1, C–2, C–3 as acted upon by the (very schematically indicated) knife blocks (KB only is shown). As aforementioned, it will be understood that the knife edges (e.g. edge $ke$ of block KB) have here engaged the top edge of the card (C–1) being fed and have thrust it to its farthest downward extremity, to be engaged between the nip of a pair of advance rolls R, PR for further advancement along picking direction FA. This knife edge is typically about one-half the thickness of the card, for instance, about 4–5 mils for a card about 8 mils thick. Here, knife block KB will thus be assumed (along with its companion block KB' to have reached its foremost excursion point and be returning (upward, see arrow) to thus complete its picking cycle. Card C–1 of "normal" thickness is shown disposed in gap G between throating elements 10–20 being engaged by waiting card C–2 and by the cam-surfaces 25 of the crenels on block 20. The card-supporting surface of bed HB, and the coextensive surface of knife 10 are seen to define a plane intersecting knees (or apices) $kn$ in the triangular crenels of block 20. The tips of knees $kn$ thus define block edge B—B, one side of nominal gap G.

As the knife blocks KB, KB' proceed upwardly, they, at times, can be observed to frictionally engage upper portions of the waiting card C–2, e.g. adjacent level A–1 thereof, along gently beveled surface KS', beveled to allow a smooth, non-tearing, sliding engagement as the blocks are thrust upwardly and thus prevent any ripping, scraping, etc. thereof. If a sharp edge of face $K_s$ were to engage card C–2 below reference level A–1 (there being no punched hole zones above this level) e.g. along level A–2, where the uppermost row of punched holes lies, these holes might be torn out. Spring guides $sp$ may be provided to maintain waiting cards (e.g. C–2, C–3) registered against knife 10 and hopper bed HB.

It will be recognized that, during the descent of knife block KB, beveled surface KS thereof is therefore apt to exert some downward thrust upon the upper portion of waiting card C–2 driving the lower edge normally down upon lands L with a certain component of thrust. Where this is of concern, the cut-outs $s$ in knife 10 may be fashioned so as to provide sufficient effective total supporting area across lands L to keep the pressure induced by this thrust below that which will deform the bottom edge of waiting cards. Such is characteristic of the embodiment in FIGURE 11 described below, where the slot depth is kept to a minimum and land-width a maximum.

Figure 5:
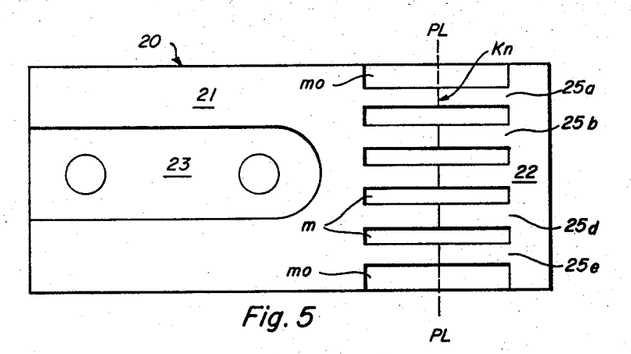
FIGURE 5 is a plan view of the throat block element in the throating assembly in FIGURE 2.
Figure 6:
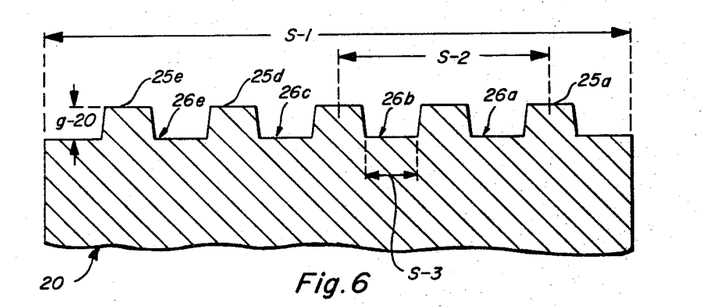
FIGURE 6 is a sectional view of the element in FIGURE 5 along lines PL—PL.
Figure 8:
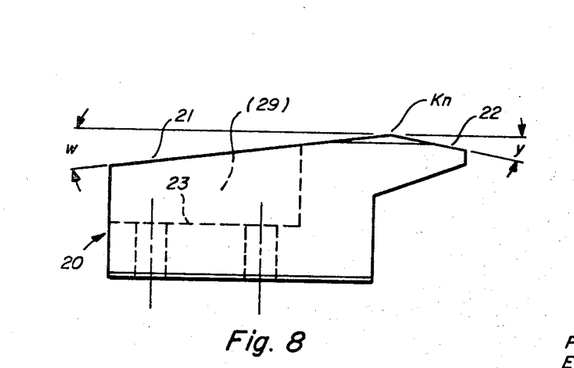
FIGURE 8 is a side elevation of the block element in FIGURES 5 and 6.

Referring now to FIGURES 5, 6 and 8, the preferred construction of block 20 will be particularly described. Block 20 will be presumed to be constructed of a relatively hard, readily machined metal, preferably being finished to a smooth, low-friction surface, at least along card-engaging surface 21 thereof, being preferably chrome plated, Teflon coated or otherwise smoothed. Surface 21, including crenel tops 25, provides a downward camming surface for the card being fed and may be inclined as indicated at about 7 degrees from the vertical. Companion beveled, clearing surface 22, is cut-away at about 10 degrees from the vertical. Block 20 may be made vertically adjustable, for instance, with the securing bolts in inset portion 23 as indicated. The apices or knees $kn$ of the card-engaging bevel, i.e. along B—B where surfaces 21, 22 intersect, will thus preferably be disposed at the level of the hopper bed HB. The aforementioned crenels $c$ are formed, for instance, by cutting a set of six merlons in beveled surfaces 21, 22 as indicated, leaving a set of five cross-sectionally-triangular crenels defined as lands therebetween, as indicated at 25–A through 25–D. These crenels may be about 30 mils high (at knees $kn$) by about 60 mils wide, being set on 150 mil centers with merlon slots $m$ therebetween being about 85 mils wide and about 30 mils deep (at knees $kn$), except for the outboard merlons $mo$ (FIGURE 10) which may be substantially less. Merlons $mo$ extend to intersect the sides of block 20, being provided as indicated in FIGURE 10 to clear card C. Block 20 may thus be about 700 mils (0.7 inch) wide, with throat length "WG" about 630 mils.

Figure 7:
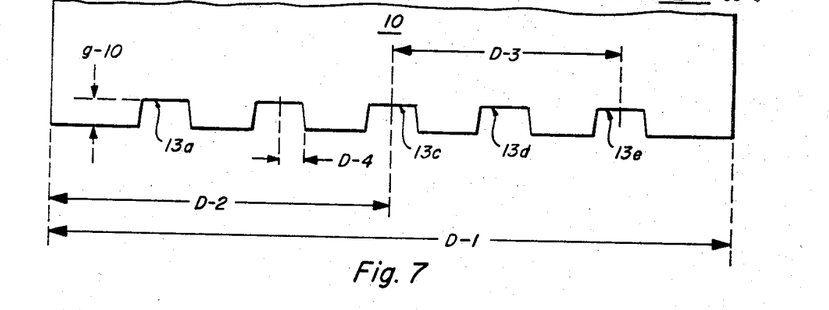
FIGURE 7 is a plan view, somewhat enlarged, of the throat knife element of the assembly in FIGURE 2.

Turning now to FIGURE 7, the corresponding typical dimensions of companion throating knife 10 may be indicated as follows: slots $s$ will, of course, substantially correspond in width and location to (i.e. register with) crenels $c$ of block 20 and may be about 60 mils wide and 20 mils deep on 150 mil centers, extending across a knife length of about 0.65 inch. It will be recognized, of course, that, as is conventional in the art, an inset 11 is provided in the top face of knife 10 wherein, for instance, through a pair of bolt-receiving bores, knife 10 may be adjustably secured laterally on bed HB so as to be movable relative to block 20 for adjusting the width of gap G.

Figure 9:
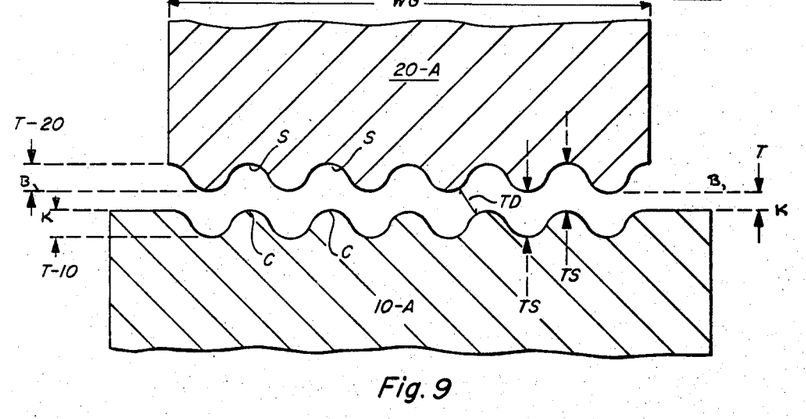
FIGURE 9 is a top sectional view similar to FIGURE 3, showing a modified embodiment of the knife and block elements therein.

FIGURE 9 indicates an alternate configuration of the throating assembly, however, one that is functionally substantially the same as that indicated before. Here, a throating block and knife 20–A, 10–A, respectively, are arranged in opposing registration to define a nominal gap T therebetween. In this case, however, the crenels $cc$ of block 20–A will be seen to be somewhat rounded in a relatively uniform continuous sinuous (sinusoidal) configuration to define similar semi-circular projections spaced relatively equidistant along the throat length WG'. Conversely registered, semi-circular slots $ss$ are machined along the reference edge K—K of knife 10–A, being shaped and disposed to each lay opposite a respective one of crenels $cc$ in registering therewith to thus define the uniform slot-gap TS therebetween. In such a case, it will be recognized that the diagonal gap TD (analogous to gap $g-d$ referred to with the relatively-orthogonal slots $s$ above) will here be no longer than this slot-gap, but be substantially the same. One feature of such an alternate configuration will be recognized as its superior ability to support the waiting card, such as card C–2 in FIGURE 3. That is, a larger effective supporting area will be provided adjacent the card being fed, thus reducing the pressure upon the lower edge of waiting cards upon which the descending knife blocks bear.

Figure 11:
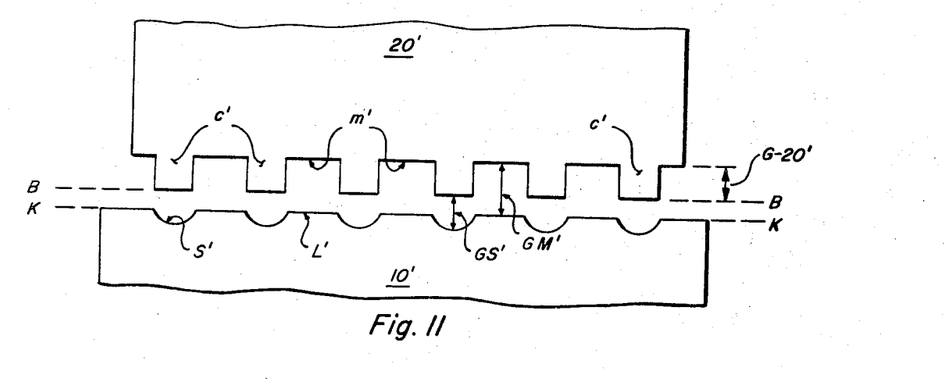
FIGURE 11 is a plan view after FIGURE 3 showing a modified embodiment of the elements therein.

It will be understood that slots $ss$ may otherwise be formed, as may crenels $cc$, so that, for instance, their configuration is not completely continuous. For instance, they may comprise hemispheric type cut-outs as described above and indicated in FIGURE 11. In FIGURE 11 where six crenels $c'$ are shown interrupted by (relatively wider) merlons m′; semi-circular slots s′ are disposed opposite crenels c′, but are cut much shallower (G–20′) than merlons m′. This arrangement will be especially convenient to machine. Here, the "slot gap" GS′ will be somewhat less than the "merlon-gap" GM′, though still sufficient to pass the maximum thickness anomaly prescribed.

It will be readily apparent that the principles of the present invention are applicable to any type of a document selection apparatus whether it be operated with a mechanical picker knife and a hopper, etc. or with other types of feeding systems. As will further be apparent, the invention illustrates apparatus which may be used to assure the single selection of documents, and yet accommodate thickness anomalies in these documents without jamming, requiring attendants or the like. The documents may be other than punched cards, of course, comprising any unit record having problems and characteristics as aforementioned.

While in accordance with the provisions of the statutes there have been illustrated and described the best forms of the invention known, it will be apparent to those skilled in the art that changes may be made in the forms of the apparatus disclosed without departing from the spirit of the invention as set forth in the appended claims and that in some cases, certain features of the invention may be used to advantage without a corresponding use of other features.

Having now described the invention, what is claimed as new and for which it is desired to secure Letters Patent is:

1. An improved document-feeding apparatus for documents of a prescribed nominal thickness, said apparatus comprising:

storage means adapted to contain a plurality of documents stacked therein, said storage means including an injection and an ejection portion; a document-selection and diverting arrangement positioned adjacent said ejection portion of said storage means and adapted to sequentially and singly divert documents stacked therein to be fed to a document-handling means; said document diverting arrangement including a crenelated throating assembly arranged at said ejection portion of said storage means and adapted to effectively separate and singly pass said documents including those having thickness deviations from said nominal thickness, up to a prescribed maximum deviation; said throating assembly including a first reference surface for engaging said documents stoppingly and aligningly while being so diverted, said surface being defined by a plurality of like crenels, said assembly also including knife means presenting a reference knife edge opposite and parallel to said surface to define a nominal gap, said edge including a plurality of like slots, said slots each being disposed opposite a respective one of said crenels and being adapted to accommodate said maximum thickness deviations while said gap is set at about said nominal thickness; whereby the crenels and the slots function together causing a slightly overthick thrust document to furrow so as to pass therebetween.

2. Improved document selection apparatus for separating documents of nominal thickness from a prescribed stack and thrusting them at a prescribed feeding zone, singly, along a prescribed feeding direction, said apparatus comprising in combination:

picker means adapted to sequentially engage singly the foremost ones of said documents and thrust them along said direction; crenelated throat means disposed in relation with said stack and said picker means so as to direct said documents along said direction guidingly and singly while accommodating prescribed maximum deviations from said nominal thickness, said throat means being disposed at said zone to engage said foremost documents and comprising a knife having a plurality of slots disposed along a reference edge thereof and lands intermediate said slots defining said edge, and also including block means having a prescribed document-engaging face formed to present a number of similar relatively coplanar ridge portions to adjacent documents, each of said ridge portions being disposed to opposite a respective one of said slots to define a nominal throat gap with said lands defining said edge; whereby the ridge portions and slots function together causing a slightly overthick thrust document to furrow so as to pass therebetween.

3. The combination as recited in claim 2 wherein the shortest gap between any one of said lands and adjacent opposite ones of said ridge portions is set to approximate said maximum thickness deviation, the normal separation distance between said reference edge and the edge of said ridge portions comprising said gap being substantially less than said maximum deviation.

4. Improved document guide means for use in a document-handling arrangement for documents of a prescribed normal thickness and having deviations from said thickness up to a prescribed maximum, said arrangement being adapted to urge a stack of said documents along a prescribed stacking direction and also adapted to divert the leading ones thereof with prescribed diverter means at a selection station along a prescribed diversion direction, relatively transverse to said stacking direction, said guide means being provided adjacent said selection station for guiding said leading documents sequentially and singly through a prescribed gap and along said diversion direction when so diverted, while also accommodating said maximum thickness deviations therein; said guide means comprising:

base plate means adapted to be engaged by a prescribed edge of said leading documents adjacent said gap as they are urged along said stacking direction, said plate means presenting a prescribed reference edge defining one side of said gap; and also comprising crenelated stop means including a plurality of spaced similar crenels adapted to engage the surface of said leading documents for guiding thereof along said second direction when so diverted, said crenels defining the other side of said gap, said reference edge including like slots cut therein, each slot being disposed in opposing registry with a respective one of said crenels, said gap being set to pass said normal thickness as a maximum while furrowing and passing document portions exhibiting said deviations up to said maximum deviation; whereby the crenels and the slots function together causing a slightly overthick thrust document to furrow so as to pass therebetween.

5. The combination as recited in claim 4 wherein said crenels include relatively coplanar beveled surface portions adapted to cammingly engage said diverted ones of said documents for guiding thereof toward said gap, said crenels being spaced from the portion of said plate means opposite thereto, and defining said opposing slot, by spacing sufficient to accommodate said maximum thickness deviation.

6. A receptacle containing stacked documents of a prescribed normal thickness arranged to be urged along a first direction said receptacle terminating in a prescribed feeding edge at a feeding end thereof; selection means for picking successively and singly the foremost ones in the stack of documents at said end of said receptacle during successive feed strokes and advancing them out of said receptacle along a prescribed thrust direction relatively normal to said first direction; and stop means including a plurality of guiding crenels defining a prescribed guide plane opposite said edge, said crenels being adapted for engaging thrust ones of said documents along said guide plane; said feeding edge being slotted therealong at portions thereon opposite said crenels so as to accommodate document thicknesses greater than said prescribed thickness; whereby said slotted portions and crenels function together causing a slightly overthick thrust document to furrow so as to pass therebetween.

7. The combination as recited in claim 6 wherein said slots are arranged so as to cooperate with said crenels so as to furrow document portions exceeding said normal thickness.

8. The combination as recited in claim 7 wherein said documents comprise punched-cards for data processing; wherein said receptacle comprises a card input hopper in a card-handling machine, said machine including card picker means arranged to thrust said leading cards along said thrust direction at prescribed selectable times wherein said crenels and associated slots are arranged in number and configuration so as to align card portions in the gap defined between said plane and said edge to be sufficiently straight and unbent to prevent abrading of said cards when so thrust through said gap, said crenels defining a card guiding plane terminating at said other side of said gap.

9. The combination as recited in claim 8 wherein said stop means comprises a crenelated throat block; wherein said crenels are inclined outwardly toward said gap along said plane and thereafter being inclined revertingly back therefrom, so as to present crenel apices defining one side of said gap; and wherein the cut depths of said slots and of the merlons between said crenels adjacent said gap is at least as large as said greater document thicknesses.

10. The combination as recited in claim 9 wherein said picker means include oscillating knife portions arranged to jog waiting cards, adjacent said leading card, and wherein said slots and accompanying crenels are so configured as to provide lands intermediate said slots along said feeding edge providing sufficient total area to support said waiting cards thereon so as to prevent their damaging impact on said lands; and wherein said feeding edge is defined by a throat knife disposed coplanar along the bed of said hopper.

11. The combination as recited in claim 10 wherein said crenels and associated slots comprise at least about three.

12. The combination as recited in claim 11 wherein said crenels comprise five coplanar ridges sloping coplanarly toward said gap to terminate so that the apices thereof define said guide plane.

13. In a document handling apparatus; document-separating throat means disposed between an inject zone and an eject zone of the apparatus; card picker knife means adapted to thrust cards broadside and singly through said throat means; said throat means including slot means in registry with oppositely positioned crenel means comprising a plurality of fixed projections spaced apart a prescribed distance across the line width of document injection, and cooperating opposed projections disposed between said first recited projections in document-flexing relation therewith; said slot and crenel means functioning together to cause a slightly overthick thrust document to furrow so as to pass therebetween.

References Cited

UNITED STATES PATENTS

| | | | |
|---|---|---|---|
| 3,224,705 | 12/1965 | Nash | 226—88 |
| 2,016,711 | 10/1935 | Ford | 271—43 |
| 2,991,075 | 7/1961 | Wheeler | 271—61 |

RICHARD F. AEGERTER, *Primary Examiner.*